United States Patent
Kawamura et al.

(10) Patent No.: US 7,797,097 B2
(45) Date of Patent: Sep. 14, 2010

(54) EXHAUST PURIFICATION DEVICE FOR INTERNAL COMBUSTION ENGINE

(75) Inventors: Jun Kawamura, Chita-gun (JP); Masakuni Yokoyama, Tokai (JP)

(73) Assignee: Denso Corporation, Kariya (JP)

( * ) Notice: Subject to any disclaimer, the term of this patent is extended or adjusted under 35 U.S.C. 154(b) by 347 days.

(21) Appl. No.: 12/119,794

(22) Filed: May 13, 2008

(65) Prior Publication Data

US 2008/0307772 A1   Dec. 18, 2008

(30) Foreign Application Priority Data

Jun. 15, 2007   (JP)   ............... 2007-158333

(51) Int. Cl.
*G06F 19/00* (2006.01)
*F01N 3/20* (2006.01)
*F01N 3/02* (2006.01)

(52) U.S. Cl. ............... 701/103; 701/104; 60/285; 60/301; 60/311

(58) Field of Classification Search ......... 701/101–105, 701/110, 113, 114; 60/274, 276, 284–286, 60/297, 299, 301, 311
See application file for complete search history.

(56) References Cited

U.S. PATENT DOCUMENTS

| | | | | |
|---|---|---|---|---|
| 3,995,356 A | * | 12/1976 | Sheppard | 29/890.128 |
| 4,270,347 A | * | 6/1981 | Fukuba et al. | 60/276 |
| 5,514,354 A | * | 5/1996 | Domesle et al. | 423/213.5 |
| 7,331,170 B2 | * | 2/2008 | Shimoda | 60/286 |
| 7,614,218 B2 | * | 11/2009 | Akagawa | 60/311 |
| 7,716,915 B2 | * | 5/2010 | Muraguchi | 60/284 |
| 2007/0271905 A1 | * | 11/2007 | Muraguchi | 60/285 |
| 2009/0082938 A1 | * | 3/2009 | Onodera et al. | 701/103 |
| 2009/0301063 A1 | * | 12/2009 | Tahara et al. | 60/286 |

FOREIGN PATENT DOCUMENTS

| | | | |
|---|---|---|---|
| JP | 52084314 A | * | 7/1977 |
| JP | 2003-120392 | | 4/2003 |
| JP | 2004176612 A | * | 6/2004 |

* cited by examiner

*Primary Examiner*—Willis R Wolfe, Jr.
(74) *Attorney, Agent, or Firm*—Nixon & Vanderhye PC

(57) ABSTRACT

When it is determined that fuel in use is low-cetane fuel or a present location point is at a high altitude, a map of rich combustion, exhaust gas fuel addition or a post-injection is rewritten on the occasion of reduction of NOx to inhibit a misfire. Also, deterioration of fuel consumption due to regeneration of a diesel particulate filter is inhibited by suppressing excessive discharge of smoke due to the rich combustion. Thus, an exhaust purification device of an internal combustion engine capable of achieving both of inhibition of the deterioration in the fuel consumption due to the regeneration of the diesel particulate filter and inhibition of torque shock accompanying the misfire during the rich combustion for the NOx reduction is provided.

6 Claims, 6 Drawing Sheets

EXHAUST PURIFICATION DEVICE FOR INTERNAL COMBUSTION ENGINE

CROSS REFERENCE TO RELATED APPLICATION

This application is based on and incorporates herein by reference Japanese Patent Application No. 2007-158333 filed on Jun. 15, 2007.

BACKGROUND OF THE INVENTION

1. Field of the Invention

The present invention relates to an exhaust purification device for an internal combustion engine having a NOx occlusion reduction type catalyst in an exhaust pipe.

2. Description of Related Art

As a conventional technology, there is an exhaust purification device of an internal combustion engine that has a catalyst in an exhaust system for promoting a reduction reaction of NOx and that grasps a combustion state of the engine from a fuel injection quantity and engine rotation speed. The exhaust purification device selects a suitable control method from multiple methods (rich combustion, a post-injection, low-temperature combustion based on EGR control, fuel addition to the exhaust system through a fuel addition valve) according to the combustion state. Thus, the technology performs an efficient reduction reaction of the NOx (for example, as described in Patent document 1: JP-A-2003-120392).

Conventionally, it is known that in order to achieve both of a NOx purification rate and suppression of a discharge quantity of particulate matters (i.e., PM), it is effective to provide multiple methods and to selectively use a method suitable for a situation out of the multiple methods. The multiple methods include a method of reducing the NOx by a method of performing combustion at a stoichiometric air fuel ratio or under by increasing a main injection quantity or by a method of performing a subsidiary injection at such a short interval immediately after the main injection that the subsidiary injection generates torque (hereinafter, referred to as rich combustion) in a low rotation speed and low load area and include a method of reducing the NOx by a method of exhaust gas fuel addition for additionally providing a fuel addition valve at a position upstream of the catalyst in the exhaust system and for injecting the fuel (as a reducing agent) directly to the catalyst or by a method of performing a post-injection for performing a subsidiary injection at a long interval after the fuel injection in a high rotation speed and high load area. However, there are some problems that should be taken into consideration when performing such the selective use. That is, for example, when the rich combustion is performed in the high rotation speed and high load area such as high-speed travel on an expressway, an ignition delay is short and the fuel is combusted before sufficiently mixed with an air. As a result, a large quantity of smoke is generated and deposition of the particulate matters in a diesel particulate filter (hereinafter, referred to as a DPF) is promoted. In this case, regeneration of the DPF for combusting and removing the particulate matters deposited in the DPF is performed frequently, so the fuel is used for combusting and removing the particulate matters and a fuel consumption is deteriorated. Therefore, the rich combustion should be preferably avoided in the state of the high rotation speed and high load area.

When there occurs a condition that makes it difficult for the fuel to combust (for example, when the engine is operated at a high altitude or when low-cetane fuel is used), the fuel becomes less ignitable and therefore there is a possibility that an appropriate driving force cannot be obtained due to a misfire (i.e., torque shock can occur) if the rich combustion is performed on the same condition as a normal period. Therefore, when the operation at the high altitude is performed or when the low-cetane fuel is used, the rich combustion in the state of the low rotation speed and low load should be preferably avoided.

The cetane number is an index for measuring ignitability of the fuel. Generally, even if certain fuel is called as the low-cetane fuel, the cetane number of the fuel varies, e.g., depending on a gas station where the fuel is obtained. In order to directly measure the cetane number of the fuel, components of the fuel have to be analyzed. However, such the measurement is difficult in the present stage, so another index is necessary. At the high altitude, the atmospheric pressure is low and the ignition of the fuel becomes difficult. Therefore, at the high altitude, a phenomenon similar to the case of using the low-cetane fuel occurs.

As described above, a large quantity of the smoke is generated if the rich combustion is performed in the state of the high rotation speed and the high load. Because of the large quantity of the smoke, a large quantity of the particulate matters are deposited inside the DPF, necessitating frequent regeneration of the DPF. As a result, the deterioration of the fuel consumption is accelerated. In order to appropriately deal with the deterioration of the fuel consumption, it is indispensable to measure the discharge quantity of the smoke. However, it is difficult to directly measure the discharge quantity of the smoke, so a certain index is necessary. Therefore, the quantity of the particulate matters deposited in a filter section provided on an exhaust side of the engine may be used as an index of the discharge quantity of the smoke. It is because when a large quantity of the particulate matters are deposited in the filter section, it means that a large quantity of the smoke has been discharged.

SUMMARY OF THE INVENTION

It is an object of the present invention to provide an exhaust purification device of an internal combustion engine capable of achieving both of inhibition of deterioration of fuel consumption due to regeneration of a diesel particulate filter and inhibition of torque shock accompanying misfire during rich combustion for NOx reduction.

According to an aspect of the present invention, an exhaust purification device of an internal combustion engine has a rich combustion device for lengthening a period of fuel injection or for performing a subsidiary injection immediately after the fuel injection, a reducing agent addition device for adding a reducing agent directly upstream of a NOx occlusion reduction type catalyst, and a post-injection device for performing a subsidiary injection in an expansion stroke or an exhaust stroke after the fuel injection. The exhaust purification device switches between the rich combustion device and the reducing agent addition device or the post-injection device in accordance with engine rotation speed and a load. Thus, the exhaust purification device controls the catalyst. The exhaust purification device has a high altitude determination device for determining whether a location point of the exhaust purification device is higher than a predetermined altitude, a low-cetane fuel determination device for determining whether a cetane number of fuel in use is lower than a predetermined cetane number, and a first catalyst reduction setting device for changing the engine rotation speed and the load for performing the rich combustion device to a high rotation speed side or a high load side when the high altitude determination device determines that the location point of the exhaust purification device is higher than the predetermined altitude or when the low-cetane fuel determination device determines that the fuel in use is the low-cetane fuel.

Thus, when an ECU determines that the cetane number of the fuel in use is low or the present location point is at the high altitude, the ECU switches a switching map of a NOx reduction method based on an operation area or rewrites map values so that an area for lengthening the fuel injection period or for performing the subsidiary injection immediately after the fuel injection (i.e., an area for performing the rich combustion) moves to the high rotation speed side or the high load side. Thus, the rich combustion, which tends to cause a misfire in a low rotation speed and low load state, is not performed when the low-cetane fuel is used or when the exhaust purification device is at the high altitude. Accordingly, the misfire and eventual torque shock can be inhibited. When the low-cetane fuel is used or when the exhaust purification device is at the high altitude, the ignition delay extends and therefore mixing of the air and the fuel is promoted. Therefore, the generation of the smoke is suppressed. In such the case, by performing the rich combustion also in a state of relatively high rotation speed and relatively high load, a high NOx purification efficiency and suitable fuel consumption can be attained.

According to another aspect of the present invention, the exhaust purification device has an ignition time measurement device for measuring a time since the fuel is injected by an injector of the engine until the fuel is ignited. The low-cetane fuel determination device determines whether the fuel in use is the low-cetane fuel based on the ignition time measured by the ignition time measurement device.

Thus, the time from the fuel injection to the ignition is used as an index for estimating the cetane number. Timing for injecting the fuel can be controlled by the engine control unit (ECU) as a control section. Therefore, it is easy to measure the time after the fuel injection to the fuel ignition. The ignition time may be measured by providing a pressure sensor in a cylinder and by measuring timing when the pressure abruptly rises. Thus, the cetane number of the fuel can be determined more correctly.

According to another aspect of the present invention, the exhaust purification device has an intake pressure measurement section for measuring intake pressure of the engine. The high altitude determination device determines whether the location point is higher than the predetermined altitude based on the intake pressure measured by the intake pressure measurement section.

Thus, a structure providing an intake pressure sensor on an intake side of the engine can correctly estimate whether the present point is at the high altitude. Accordingly, selection between the rich combustion device and the reducing agent addition device or selection between the rich combustion device and the post-injection device can be performed more appropriately. As a result, deterioration of the fuel consumption due to the regeneration of the DPF can be inhibited and torque shock accompanying the misfire during the rich combustion for the NOx reduction can be inhibited.

According to another aspect of the present invention, an exhaust purification device of an internal combustion engine has a rich combustion device for lengthening a period of fuel injection or for performing a subsidiary injection immediately after the fuel injection, a reducing agent addition device for adding a reducing agent directly upstream of a NOx occlusion reduction type catalyst and a post-injection device for performing a subsidiary injection in an expansion stroke or an exhaust stroke after the fuel injection. The exhaust purification device switches between the rich combustion device and the reducing agent addition device or the post-injection device in accordance with engine rotation speed and a load. Thus, the exhaust purification device controls the catalyst. The exhaust purification device has a particulate matter discharge quantity measurement section for measuring a discharge quantity of particulate matters, a particulate matter discharge quantity determination device for determining whether the discharge quantity of the particulate matters measured with the particulate matter discharge quantity measurement section is greater than a first predetermined value, and a second catalyst reduction setting device for changing the engine rotation speed and the load for performing the rich combustion device to a low rotation speed side or a low load side when the particulate matter discharge quantity determination device determines that the discharge quantity of the particulate matters is greater than the first predetermined value.

Thus, when the ECU determines that the discharge quantity of the smoke (i.e., the particulate matters dispersed in the gas) is large, the ECU switches the switching map of the NOx reduction method based on the operation area or rewrites the map values so that the area for performing the rich combustion moves to the low rotation speed and low load side. Thus, in the area of the engine rotation speed and the load where the rich combustion is performed in a normal period, the exhaust gas fuel addition or the post-injection is performed instead of the rich combustion. Therefore, excessive discharge of the smoke due to the rich combustion is inhibited, and the regeneration frequency of the DPF is suppressed. The suppression of the regeneration frequency of the DPF leads to inhibition of the deterioration of the fuel consumption.

According to another aspect of the present invention, an exhaust purification device of an internal combustion engine has a rich combustion device for lengthening a period of fuel injection or for performing a subsidiary injection immediately after the fuel injection, a reducing agent addition device for adding a reducing agent directly upstream of a NOx occlusion reduction type catalyst, and a post-injection device for performing a subsidiary injection in an expansion stroke or an exhaust stroke after the fuel injection. The exhaust purification device switches between the rich combustion device and the reducing agent addition device or the post-injection device in accordance with engine rotation speed and a load. Thus, the exhaust purification device controls the catalyst. The exhaust purification device has a filter section provided in an exhaust side passage of the engine for collecting particulate matters, a particulate matter deposition quantity related data measurement section for measuring data indicative of a deposition quantity of the particulate matters in the filter section, a particulate matter deposition quantity derivation device for deriving the deposition quantity of the particulate matters in the filter section from a measurement result of the particulate matter deposition quantity related data measurement section, a particulate matter deposition increase amount calculation device for calculating the deposition quantity of the particulate matters per unit travel distance or unit time from the deposition quantity of the particulate matters derived by the particulate matter deposition quantity derivation device, a particulate matter deposition increase amount determination device for determining whether the deposition quantity of the particulate matters per unit travel distance or unit time calculated by the particulate matter deposition increase amount calculation device is greater than a second predetermined value, and a third catalyst reduction setting device for changing the engine rotation speed and the load for performing the rich combustion device to a low rotation speed side or a low load side when the particulate matter deposition increase amount determination device determines that the deposition quantity of the particulate matters per unit travel distance or unit time is greater than the second predetermined value.

When the smoke passes through the filter section, part of the smoke is deposited in the filter as the particulate matters. Therefore, the measurement of the change in the particulate matter deposition quantity in the filter enables more accurate grasp of excessive discharge of the smoke. Accordingly, an efficient NOx reduction method can be selected.

According to yet another aspect of the present invention, in the exhaust purification device, the particulate matter deposition quantity related data measurement section is a differential pressure sensor section for measuring difference between air pressures at an inlet and an outlet of the filter section, and the particulate matter deposition increase amount calculation device derives the deposition quantity of the particulate matters per unit travel distance or unit time from the difference between the air pressures at the inlet and the outlet of the filter section measured by the differential pressure sensor section.

When the particulate matters are deposited in the filter section, the exhaust gas is not discharged from the inlet to the outlet smoothly, so the difference arises between the air pressures at the inlet and the outlet of the filter section. Therefore, the measurement of the difference in the air pressure across the filter section with the differential pressure sensor enables more accurate obtainment of the quantity of the particulate matters deposited in the filter section. The exhaust purification device of the internal combustion engine having the configuration according to the aspect of the present invention can correctly calculate the quantity of particulate matters deposited in the filter section. As a result, the predetermined engine rotation speed and the predetermined load for switching between the rich combustion device and the reducing agent addition device or between the rich combustion device and the post-injection device as the devices for reducing the catalyst can be set more appropriately.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Next, embodiments of the present invention will be described with reference to the drawings.

Figure 1:
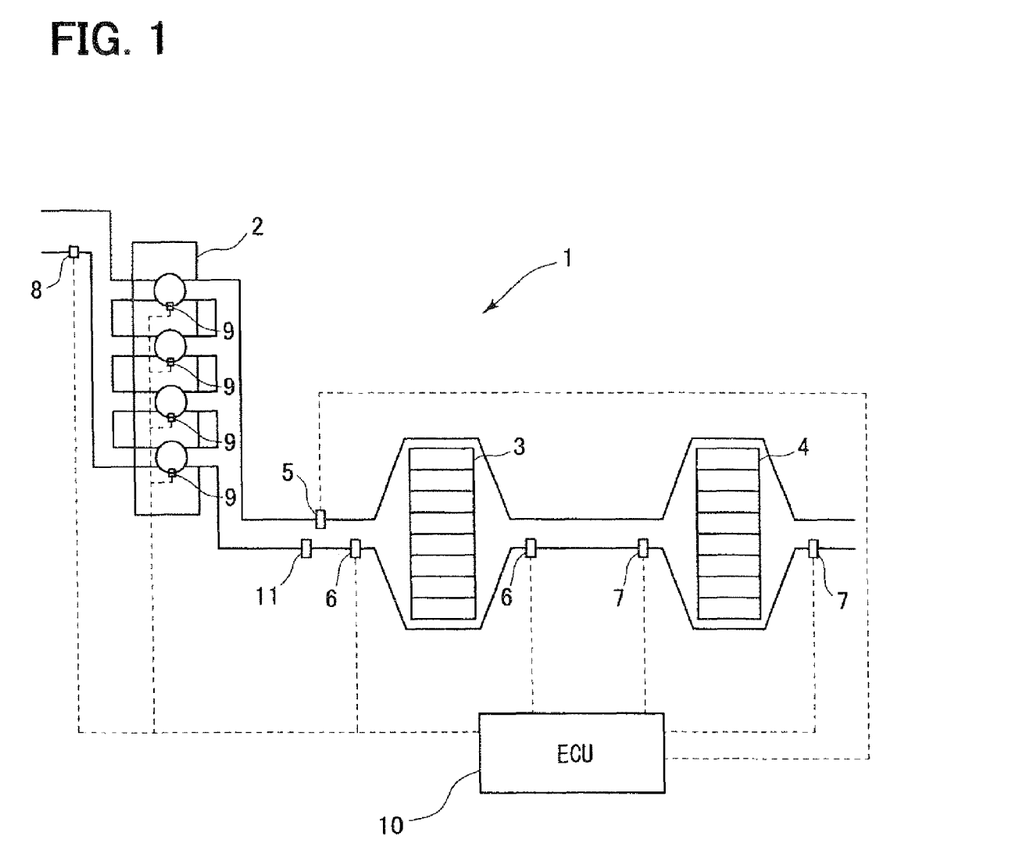
FIG. 1 is a system diagram showing an exhaust purification device of an internal combustion engine according to a first embodiment of the present invention.

FIG. 1 is a system diagram showing an exhaust purification device of an internal combustion engine 1 according to a first embodiment of the present invention. A diesel engine 2 shown in FIG. 1 serves as a motor. A diesel particulate filter 3 (DPF) as a filter section for collecting particulate matters contained in exhaust gas of the diesel engine 2 is arranged in a passage on an exhaust side of the diesel engine 2. Further, a Lean NOx trap 4 (hereinafter, referred to as LNT) as a catalyst of a NOx occlusion reduction type for removing nitrogen oxides (NOx) contained in the exhaust gas is arranged downstream of the DPF 3. The NOx occlusion reduction type catalyst occludes the NOx when an oxygen concentration of the exhaust gas is high and discharges the NOx when the oxygen concentration of the exhaust gas is low. The NOx performs an oxidation-reduction reaction with HC or CO contained in the exhaust gas when discharged and is oxidized or reduced to $CO_2$, $H_2O$ and $N_2$. The NOx in the exhaust gas is removed through this reaction.

A fuel addition valve 5 is provided in an exhaust passage between an exhaust port of the diesel engine 2 and the DPF 3 in a direction to inject the fuel into the passage. The fuel injected from the fuel addition valve 5 is mixed in the exhaust gas and serves as a reducing agent for the NOx catalyst.

An intake pressure sensor 8 (i.e., an intake pressure measurement section) is provided in a passage on an intake port side of the diesel engine 2 for measuring pressure in an intake port. The intake pressure sensor 8 is electrically connected with an ECU 10 and transmits a measurement value to the ECU 10. The atmosphere becomes thin and the atmospheric pressure falls at the high altitude. Therefore, the pressure measured with the intake pressure sensor 8 is used as an index for calculating an altitude of a location point.

A pressure sensor 9 used as an ignition measurement section is provided in each cylinder of the diesel engine 2 for measuring pressure in the cylinder. The pressure sensor 9 is electrically connected with the ECU 10 and transmits a measurement value to the ECU 10. The ECU 10 performs processing by using a point of rapid pressure change, which is detected based on the measurement value of the pressure in the cylinder sent from the pressure sensor 9, as an explosion point. The explosion point is used when the ECU 10 determines whether the fuel in use is low-cetane fuel.

Differential pressure sensors 6 (i.e., a particulate matter deposition quantity related data measurement section) are provided at an inlet and an outlet of the DPF 3 for measuring air pressures respectively and for measuring a difference therebetween. The differential pressure sensors 6 are electrically connected with the ECU 10 and transmit measurement values to the ECU 10. If the particulate matters are deposited in the DPF 3, passing of the exhaust gas through the DPF 3 is worsened, so the difference in the air pressure is caused between the inlet and the outlet of the DPF 3. Therefore, the quantity of the particulate matters deposited in the DPF 3 can be estimated by measuring the difference in the air pressure between the inlet and the outlet.

Air/fuel ratio sensors 7 (hereinafter, referred to also as A/F sensors) are provided at an inlet and an outlet of the LNT 4 respectively. Thus, the oxygen concentrations of the exhaust gas across the catalyst are measured. The A/F sensors 7 are electrically connected with the ECU 10 and transmit the measurement values to the ECU 10. As mentioned above, the discharge of the NOx from the LNT 4 is dependent on the oxygen concentration of the exhaust gas. Therefore, the measurement values of the A/F sensors 7 serve as indexes for deciding the quantity of the fuel to be injected by the fuel addition valve 5.

The fuel addition valve 5, the differential pressure sensors 6, the A/F sensors 7 and the intake pressure sensor 8 are electrically connected with the engine control unit 10 (ECU). The ECU 10 receives the measurement values from the respective sensors and performs the engine control based on the measurement values. For example, the ECU 10 performs regeneration of the DPF 3 based on the measurement values obtained with the differential pressure sensors 6 and decides the injection quantity of the fuel addition valve 5 based on the measurement values of the A/F sensors 7. In addition, the ECU 10 performs various types of control relating to the engine such as decision of fuel injection timing.

In addition, a smoke sensor 11 (i.e., a particulate matter sensor) as a particulate matter discharge quantity measurement section may be provided in the passage between the exhaust side of the diesel engine 2 and the DPF 3 to measure the quantity of the smoke mixed in the exhaust gas. The smoke sensor 11 is electrically connected to the ECU 10 and transmits the measurement value to the ECU 10. In this case, the ECU 10 estimates the quantity of the particulate matters deposited in the DPF 3 from the measurement value of the smoke sensor 11.

Figure 2:
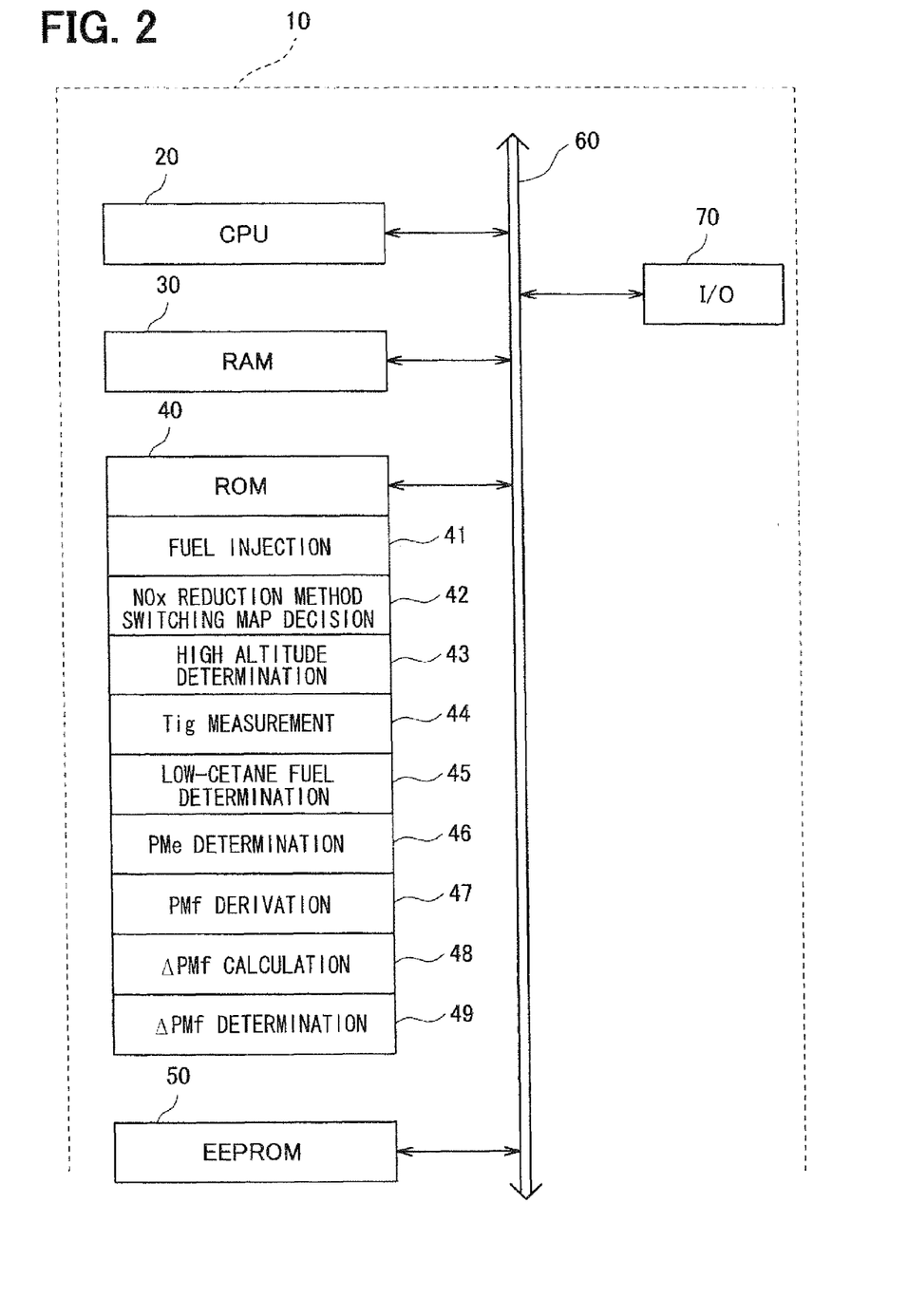
FIG. 2 is a diagram showing a configuration example of an ECU according to the first embodiment.

FIG. 2 is a schematic diagram showing a construction example of the ECU 10 according to the present embodiment. The ECU 10 consists of CPU 20 that controls respective components constituting the ECU 10, RAM 30 serving as a workspace of computation performed by the CPU 20, ROM 40 that stores control programs and various data, and EEPROM 50 serving as a nonvolatile memory that stores various settings. The components of the ECU 10 perform data communication with each other through a bus 60. Electric connection with exteriors such as various sensors is made through the bus 60 and an I/O 70.

The ROM 40 includes a fuel injection program 41 (a rich combustion device, a reducing agent addition device, a post-injection device) that gives a command of fuel injection to the injector provided to the diesel engine 2 and to the fuel addition valve 5 provided in the passage on the exhaust side according to set fuel maps, a NOx reduction method switching map decision program 42 (a first catalyst reduction setting device, a second catalyst reduction setting device, a third catalyst reduction setting device) that decides a switching map of the NOx reduction method based on an operation area, a high altitude determination program 43 (a high altitude determination device) that determines whether the location point is a high altitude based on the measurement value obtained with the intake pressure sensor 8 provided in the passage on the intake side, an ignition time measurement program 44 (an ignition time measurement device) that measures an ignition time Tig from the fuel injection to the ignition measured with the pressure sensor 9, a low-cetane fuel determination program 45 (a low-cetane fuel determination device) that determines whether the fuel in use is the low-cetane fuel, a particulate matter discharge quantity determination program 46 (a particulate matter discharge quantity determination device) that determines whether the discharge quantity PMe of the smoke measured with the smoke sensor 11 is greater than a first predetermined value, a particulate matter deposition quantity derivation program 47 (a particulate matter deposition quantity derivation device) that measures a deposition quantity PMf of the particulate matters deposited in the DPF 3 from the differential pressure measured with the differential pressure sensors 7, a particulate matter deposition increase amount calculation program 48 (a particulate matter deposition increase amount calculation device) that calculates an increase amount $\Delta$PMf of the deposition quantity PMf of the particulate matters from the measured particulate matter deposition quantity PMf and travel distance or a drive time of the engine 2, and a particulate matter deposition increase amount determination program 49 (a particulate matter deposition increase amount determination device) that determines whether the deposition increase amount $\Delta$PMf of the particulate matters calculated by the particulate matter deposition increase amount calculation program 48 is greater than a second predetermined value. The CPU 20 executes various types of processing by deploying the contents of the ROM 40 to the RAM 30. The CPU 20 executes various types of processing by deploying the values of the various types of settings necessary for the processing from the EEPROM 50 to the RAM 30. When there is change to the settings, the CPU 20 saves the settings by writing the change value in the EEPROM 50.

Figure 3A:
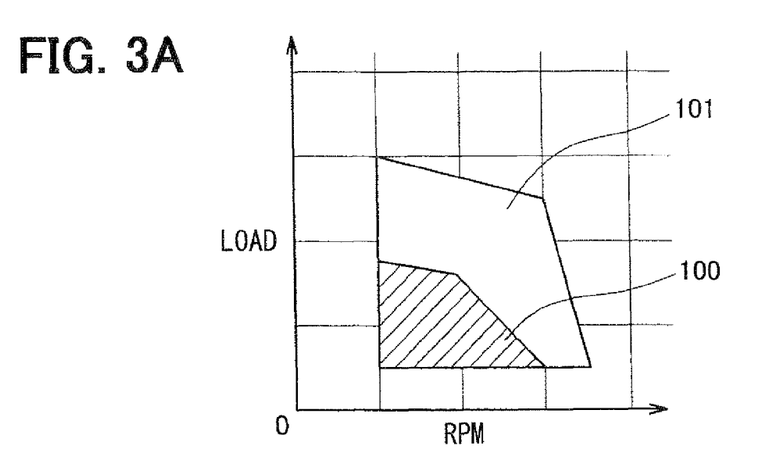
FIGS. 3A to 3C are diagrams each showing a switching map of a NOx reduction method based on an operation area according to the first embodiment.

FIG. 3A shows a switching map of the NOx reduction method based on the operation area during a normal period. A vertical axis expresses a load applied to the engine 2 and a horizontal axis expresses engine rotation speed RPM. An area 100 in FIG. 3A shows an area of the engine rotation speed RPM and the load for performing the rich combustion to reduce the NOx occlusion reduction type catalyst. An area 101 in FIG. 3A shows an area of the engine rotation speed RPM and the load for performing the exhaust gas fuel addition or the post-injection to reduce the NOx occlusion reduction type catalyst. As shown in FIG. 3A, the area for performing the rich combustion is the area of the low rotation speed and the low load. It is because a large quantity of the smoke will be generated if the rich combustion is performed at high rotation speed and a high load. This will cause a large quantity of the particulate matters to be deposited in the DPF 3, so the frequency of the regeneration increases and fuel consumption deteriorates. Therefore, in the state of the high rotation speed and the high load, the reduction method of the NOx occlusion reduction type catalyst is switched from the rich combustion to the exhaust gas fuel addition or the post-injection. In the case of the post-injection, only little part of the fuel combusts in the cylinder. In the case of the exhaust gas fuel addition, the fuel is injected to the exhaust side passage, so the fuel does not combust. Thus, in the case of the post-injection or the exhaust gas fuel addition, the combustion is small and the production of $CO_2$ and $H_2$ as the cause of the reduction of the NOx is small. Accordingly, a NOx purification rate is lower than the rich combustion but the discharge quantity of the smoke can be reduced. From the above points, the rich combustion is performed at the low rotation speed and the low load, and the exhaust gas fuel addition or the post-injection is performed at the high rotation speed and the high load.

The NOx occlusion reduction type catalyst is effectively activated in a limited temperature range. It is generally said that such the temperature range is from 250 to 400 degrees C. If the temperature departs from the temperature range, progression of the reaction will fall rapidly. Therefore, in a range over certain engine rotation speed and load, the temperature rises excessively and the reaction stops progressing. This is the reason why there are upper limits to the engine rotation speed and the load in the area 101.

The area for the rich combustion, the exhaust gas fuel addition or the post-injection is not set in an area of the very low rotation speed and the very low load in FIG. 3A. It is because the lower limit of the operation area is defined by the rotation speed and the load of idling operation and the engine is not operated at the rotation speed and load lower than those of the idling operation.

Figure 3B:
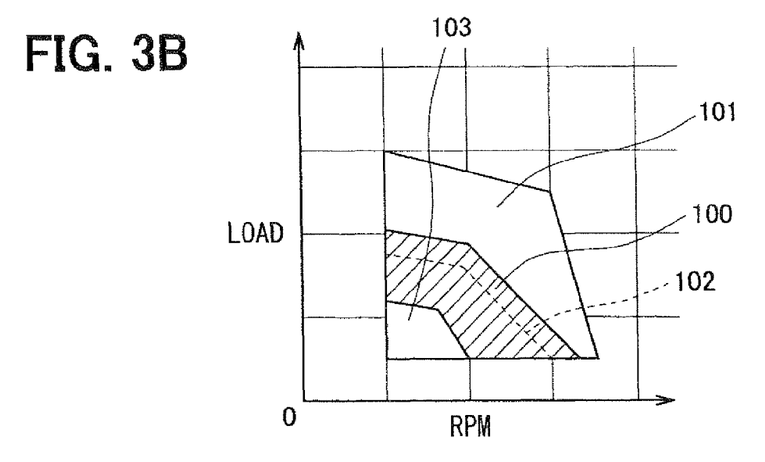

FIG. 3B shows a switching map of the NOx reduction method based on the operation area used when the ECU 10 determines that the fuel in use is the low-cetane fuel or the location point is the high altitude. An area 100 in FIG. 3B shows an area of the engine rotation speed RPM and the load for performing the rich combustion. An area 101 in FIG. 3B shows an area of the engine rotation speed RPM and the load for performing the exhaust gas fuel addition or the post-injection. A dotted line 102 shows a boundary for switching between the rich combustion and the exhaust gas fuel addition or the post-injection during the normal period. If the rich combustion is performed at the higher rotation speed and the higher load than the dotted line 102 during the normal period, a large quantity of the smoke is generated. Therefore, the NOx reduction through the rich combustion is not performed at the higher rotation speed and the higher load than the dotted line 102 during the normal period.

It is determined whether the location point is the high altitude by measuring the atmospheric pressure. The intake pressure sensor 8 is provided on the intake side of the engine 2 for measuring atmospheric pressure. Since the atmospheric pressure changes with the altitude, the altitude can be determined by measuring the atmospheric pressure. When the high altitude determination program 43 determines that the location point is the high altitude from the measured altitude, the switching map of the NOx reduction method based on the operation area is rewritten. Alternatively, a predetermined value may be set, and the location point may be determined to be the high altitude when the measured atmospheric pressure is lower than the predetermined value. Alternatively, the altitude may be determined from the present location point shown in a car navigation system and registered map data (altitude data).

It is determined whether the fuel in use is the low-cetane fuel by measuring the time necessary from the main injection to the ignition in the cylinder. The measurement is performed by providing the pressure sensor 9 in the cylinder. The point when the pressure changes rapidly is the explosion point. The time from the injection point to the explosion point is measured, and the cetane number is estimated from the measurement value. The fuel becomes less combustible as the cetane number decreases. Therefore, it is considered that the cetane number reduces as the time to the explosion lengthens. When the low-cetane fuel determination program 45 determines that the fuel in use is the low-cetane fuel, the switching map of the NOx reduction method based on the operation area is rewritten. Alternatively, a fifth predetermined value may be set, and it may be determined that the fuel in use is the low-cetane fuel when the measured time is longer than the predetermined value.

The oxygen concentration is low at the high altitude and the cetane number is low when the low-cetane fuel is used. Such the situations provide environments where the fuel does not combust easily. Therefore, under such the situations, the map is switched or map values are rewritten so that the rich combustion is performed also in the area of the higher rotation speed and the higher load than in the normal period. Through the map alteration, the rich combustion is performed also in the area where the rich combustion is not performed in the normal period. Thus, more efficient NOx reduction can be performed and the deterioration of the fuel consumption can be inhibited. In the case of FIG. 3B, the area where the rich combustion is not performed in the normal period but the rich combustion is performed when the low-cetane fuel is used or at the high altitude is the area below the area 101 and above the dotted line 102.

As mentioned above, the environment where the fuel is difficult to combust is provided at the high altitude or when the low-cetane fuel is used. In such the environment, there is a possibility that the cylinder temperature is low and the fuel does not combust in an operation area of the low rotation speed and the low load shown by an area 103 in FIG. 3B. When excessive fuel supply is performed under such the condition, there is a possibility that the cylinder in the engine gets wet with the fuel, causing a misfire. In order to prevent the misfire, in the area 103, the method is switched from the rich combustion to the exhaust gas fuel addition or the post-injection, thereby suppressing the misfire due to the excess of the fuel. The suppression of the misfire leads to suppression of torque shock.

Figure 3C:
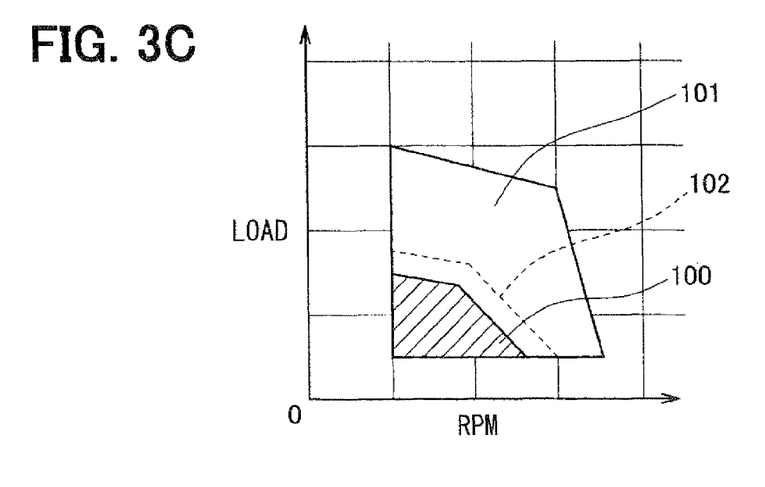

FIG. 3C shows a NOx reduction method switching map in the case where the ECU 10 determines that the particulate matter deposition increase amount ΔPMf of the DPF 3 is greater than the second predetermined value. As in the case of FIG. 3B, an area 100 in FIG. 3C shows an area of the engine rotation speed RPM and the load for performing the rich combustion, and an area 101 shows an area of the engine rotation speed RPM and the load for performing the exhaust gas fuel addition or the post-injection. A dotted line 102 in FIG. 3C shows a boundary for switching the method between the rich combustion and the exhaust gas fuel addition or the post-injection in the normal period. If the particulate matter deposition quantity increases, the regeneration of the DPF 3 is performed frequently. A large quantity of the fuel is used in the regeneration of the DPF 3. Therefore, the deterioration of the fuel consumption increases if the regeneration of the DPF 3 is performed frequently. In order to inhibit the deterioration of the fuel consumption, the map is switched or map values are rewritten so that the upper limit values of the engine rotation speed RPM and the load for performing the rich combustion are lowered. As mentioned above, the smoke production is lowered in the case of the exhaust gas fuel addition or the post-injection as compared to the case of the rich combustion. By switching the reduction method, there occurs an area where the exhaust gas fuel addition or the post-injection is performed at the engine rotation speed and the load, at which the rich combustion is performed during the normal period. Thus, the discharge quantity of the smoke can be suppressed.

Next, a procedure of the switching of the NOx reduction method will be explained with reference to a flowchart.

Figure 4:
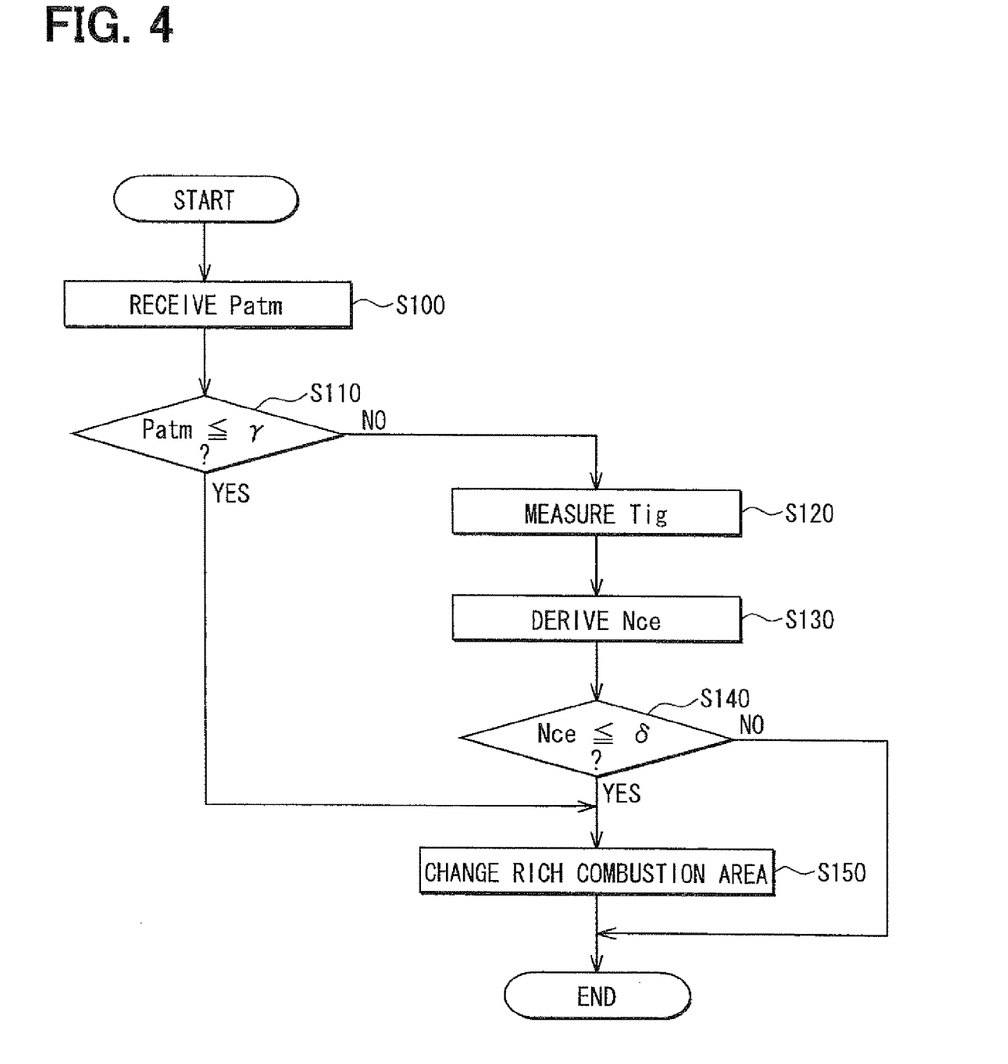
FIG. 4 is a flowchart showing switching processing of the NOx reduction method according to the first embodiment.

FIG. 4 is a flowchart showing an example of switching processing of the NOx reduction method according to the present embodiment. First, the ECU 10 measures the atmospheric pressure Patm with the intake pressure sensor 8 on the intake side and receives the measurement value in S100 (S denotes "step"). Then, the ECU 10 determines whether the received measurement value of the atmospheric pressure Patm is equal to or lower than a third predetermined value γ in S110. If it is determined that the measurement value of the atmospheric pressure Patm is equal to or lower than the third predetermined value γ (S110: YES), the ECU 10 determines that the location point is higher than a predetermined altitude and switches the switching map of the NOx reduction method or rewrites the map values so that the area for performing the rich combustion moves to the high rotation speed and high load area side in S150. Then, the switching processing of the NOx reduction method is ended. As mentioned above, the altitude may be derived from the measurement value of the atmospheric pressure Patm or the altitude of the location point may be obtained from the map data of the car navigation system, and it may be determined whether the altitude is higher than the predetermined altitude. By using the map data in combination, the altitude can be determined more correctly.

When the measurement value of the atmospheric pressure Patm is greater than the third predetermined value γ (S110:

NO), the ECU 10 measures the ignition time Tig from the fuel injection to the ignition in S120. The ECU 10 measures the ignition time Tig from the main injection to the ignition with the command of the main injection transmitted by the ECU 10 to the injector and with the pressure sensor 9 provided to the cylinder. The ECU 10 derives the cetane number Nce from the measured time Tig.

Then, the ECU 10 derives the cetane number Nce of the fuel in use from the measured ignition time Tig from the main injection to the ignition in S130. Then, the ECU 10 determines whether the derived cetane number Nce is equal to or less than a fourth predetermined value $\delta$ in S140. When the derived cetane number Nce is equal to or less than the fourth predetermined value $\delta$ (S140: YES), the ECU 10 determines that the fuel in use is the low-cetane fuel and the ECU 10 switches the switching map of the NOx reduction method or rewrites the map values so that the area for performing the rich combustion changes to the high rotation speed and high load area side in S150. Then, the switching processing of the NOx reduction method is ended.

When the derived cetane number Nce is greater than the fourth predetermined value $\delta$ (S140: NO), the ECU 10 determines that the fuel in use is not the low-cetane fuel and ends the processing.

As mentioned above, alternatively, the fifth predetermined value may be set, and it may be determined whether the fuel in use is the low-cetane fuel by comparing the measured ignition time Tig from the main injection to the ignition with the fifth predetermined value.

The above is the procedure of the switching of the NOx reduction method performed at the high altitude or when the low-cetane fuel is used. Next, a procedure of switching the NOx reduction method based on the discharge quantity of the particulate matters will be explained.

Figure 5:
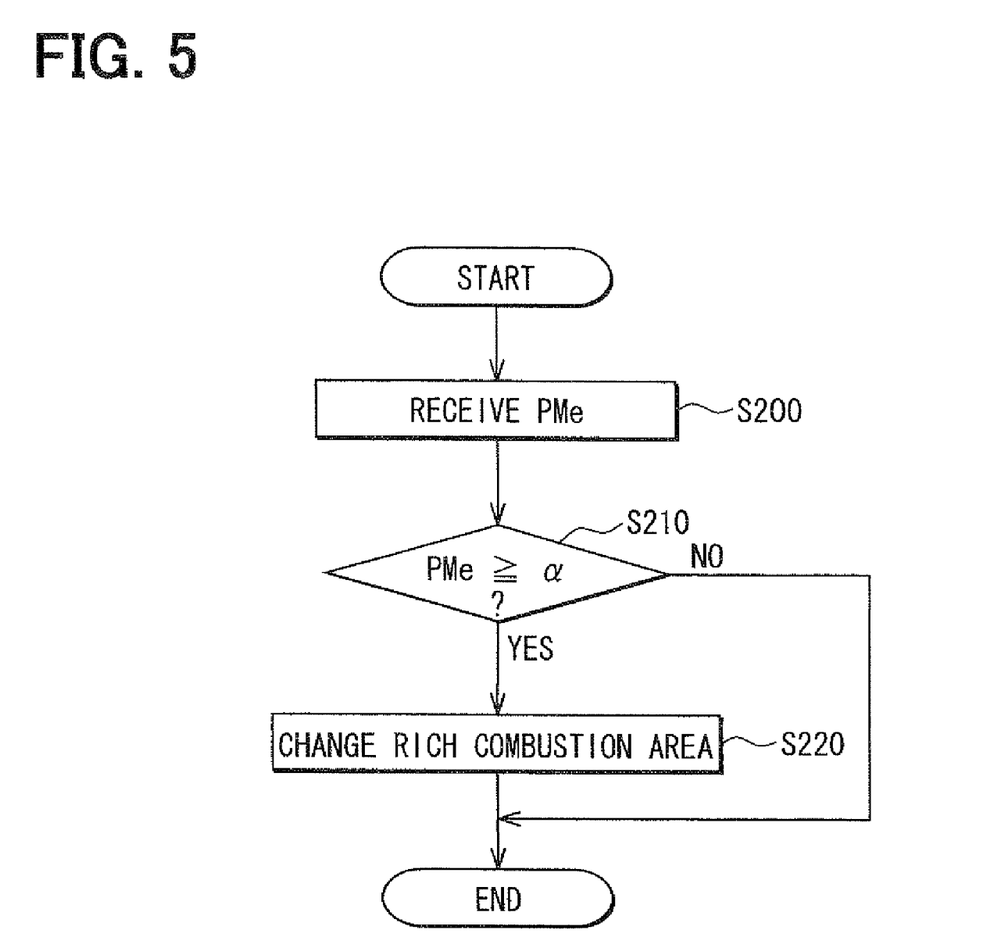
FIG. 5 is a flowchart showing switching processing of a NOx reduction method according to a second embodiment of the present invention.

FIG. 5 is a flowchart showing an example of switching processing of the NOx reduction method according to a second embodiment of the present invention. First, the ECU 10 measures the discharge quantity PMe of the smoke with the smoke sensor 11 and receives the measurement value in S200.

Then, the ECU 10 determines whether the measured discharge quantity PMe of the smoke is equal to or greater than the first predetermined value $\alpha$ in S210. When the discharge quantity PMe of the smoke is equal to or greater than the first predetermined value $\alpha$ (S210: YES), the ECU 10 determines that a large quantity of the smoke is generated and switches the switching map of the NOx reduction method or rewrites the map values so that the area for performing the rich combustion changes toward the low rotation and low load area side in S220. Then, the switching processing of the NOx reduction device is ended.

When the discharge quantity PMe of the smoke is less than the first predetermined value $\alpha$ (S210: NO), the ECU 10 determines that the large quantity of the smoke is not generated and ends the switching processing of the NOx reduction method.

The above is the procedure for switching the NOx reduction method based on the discharge quantity of the smoke. Next, a procedure of switching the NOx reduction method based on the deposition quantity of the particulate matters will be explained.

Figure 6:
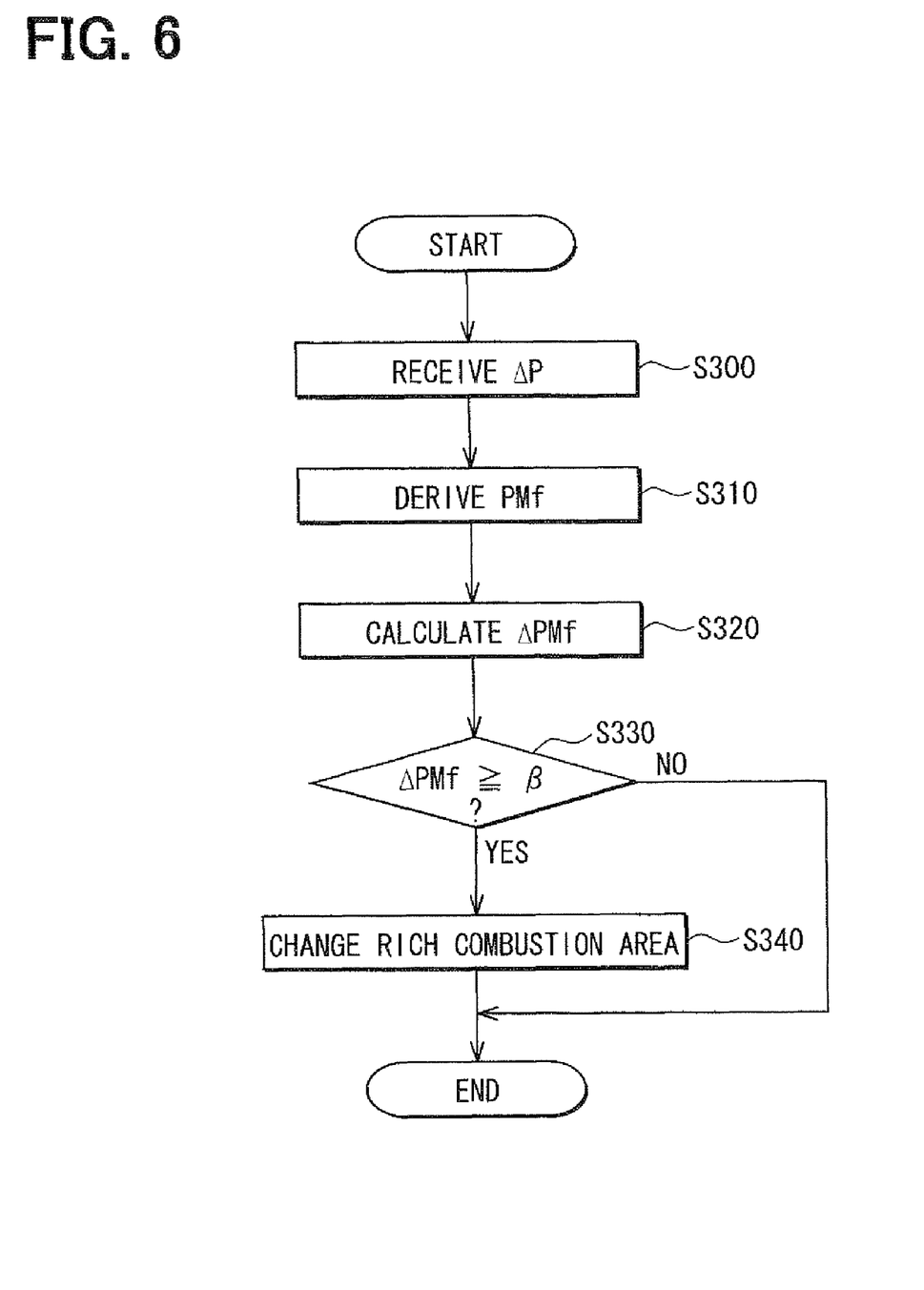
FIG. 6 is a flowchart showing switching processing of a NOx reduction method according to a third embodiment of the present invention.

FIG. 6 is a flowchart showing an example of switching processing of the NOx reduction method according to a third embodiment of the present invention. First, the ECU 10 measures the differential pressure $\Delta P$ between the inlet and the outlet of the DPF 3 with the differential pressure sensors 6 and receives the measurement value $\Delta P$ in S300. Then, the ECU 10 calculates the particulate matter deposition quantity PMf from the measurement value $\Delta P$ in S310.

Then, the ECU 10 calculates an increase degree $\Delta$PMf of the particulate matter deposition quantity PMf in S320. The increase degree $\Delta$PMf of the particulate matter deposition quantity PMf is calculated from the particulate matter deposition quantity PMf and a travel distance. The increase degree $\Delta$PMf may be calculated from the particulate matter deposition quantity PMf and a travel period.

Then, the ECU 10 determines whether the calculated increase degree $\Delta$PMf of the particulate matter deposition quantity PMf is equal to or greater than the second predetermined value $\beta$ in S330. When the increase degree $\Delta$PMf of the particulate matter deposition quantity PMf is equal to or greater than the second predetermined value $\beta$ (S330: YES), the ECU 10 determines that a large quantity of the smoke is generated and switches the switching map of the NOx reduction method or rewrites the map values so that the area for performing the rich combustion changes to the low rotation speed and low load area side in S340. Then, the switching processing of the NOx reduction method is ended.

When the increase degree $\Delta$PMf of the particulate matter deposition quantity PMf is less than the second predetermined value $\beta$ (S330: NO), the ECU 10 determines that a large quantity of the smoke is not generated and ends the switching processing of the NOx reduction method.

The above described embodiments may be modified arbitrarily. For example, the particulate matter deposition quantity or the particulate matter deposition increase amount may be derived from the smoke sensor 11. When the vehicle speed is low, there is a possibility that a deviation occurs in the measurement value of the differential pressure sensor 6. Therefore, a structure using the smoke sensor in combination enables more accurate derivation of the particulate matter deposition quantity and the deposition quantity increase amount.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An exhaust purification device of an internal combustion engine that has a rich combustion means for lengthening a period of fuel injection or for performing a subsidiary injection immediately after the fuel injection, a reducing agent addition means for adding a reducing agent directly upstream of a NOx occlusion reduction type catalyst, and a post-injection means for performing a subsidiary injection in an expansion stroke or an exhaust stroke after the fuel injection and that switches between the rich combustion means and the reducing agent addition means or the post-injection means in accordance with engine rotation speed and a load, whereby the exhaust purification device controls the catalyst, the exhaust purification device comprising:

a particulate matter discharge quantity measurement section for measuring a discharge quantity of particulate matters;

a particulate matter discharge quantity determination means for determining whether the discharge quantity of the particulate matters measured with the particulate matter discharge quantity measurement section is greater than a first predetermined value; and a second catalyst reduction setting means for changing the engine rotation speed and the load for performing the rich combustion means to a low rotation speed side or a low load side when the particulate matter discharge quantity determination means determines that the discharge quantity of the particulate matters is greater than the first predetermined value.

2. An exhaust purification device of an internal combustion engine that has a rich combustion means for lengthening a period of fuel injection or for performing a subsidiary injection immediately after the fuel injection, a reducing agent addition means for adding a reducing agent directly upstream of a NOx occlusion reduction type catalyst, and a post-injection means for performing a subsidiary injection in an expansion stroke or an exhaust stroke after the fuel injection and that switches between the rich combustion means and the reducing agent addition means or the post-injection means in accordance with engine rotation speed and a load, whereby the exhaust purification device controls the catalyst, the exhaust purification device comprising:
- a filter section provided in an exhaust side passage of the engine for collecting particulate matters;
- a particulate matter deposition quantity related data measurement section for measuring data indicative of a deposition quantity of the particulate matters in the filter section;
- a particulate matter deposition quantity derivation means for deriving the deposition quantity of the particulate matters in the filter section from a measurement result of the particulate matter deposition quantity related data measurement section,
- a particulate matter deposition increase amount calculation means for calculating the deposition quantity of the particulate matters per unit travel distance or unit time from the deposition quantity of the particulate matters derived by the particulate matter deposition quantity derivation means;
- a particulate matter deposition increase amount determination means for determining whether the deposition quantity of the particulate matters per unit travel distance or unit time calculated by the particulate matter deposition increase amount calculation means is greater than a second predetermined value; and
- a third catalyst reduction setting means for changing the engine rotation speed and the load for performing the rich combustion means to a low rotation speed side or a low load side when the particulate matter deposition increase amount determination means determines that the deposition quantity of the particulate matters per unit travel distance or unit time is greater than the second predetermined value.

3. The exhaust purification device as in claim 2, wherein the particulate matter deposition quantity related data measurement section is a differential pressure sensor section for measuring difference between air pressures at an inlet and an outlet of the filter section, and
the particulate matter deposition increase amount calculation means derives the deposition quantity of the particulate matters per unit travel distance or unit time from the difference between the air pressures at the inlet and the outlet of the filter section measured by the differential pressure sensor section.

4. An exhaust purification device of an internal combustion engine that has a rich combustion means for lengthening a period of fuel injection or for performing a subsidiary injection immediately after the fuel injection, a reducing agent addition means for adding a reducing agent directly upstream of a NOx occlusion reduction type catalyst, and a post-injection means for performing a subsidiary injection in an expansion stroke or an exhaust stroke after the fuel injection and that switches between the rich combustion means and the reducing agent addition means or the post-injection means in accordance with engine rotation speed and a load, whereby the exhaust purification device controls the catalyst, the exhaust purification device comprising:
- a high altitude determination means for determining whether a location point of the exhaust purification device is higher than a predetermined altitude;
- a low-cetane fuel determination means for determining whether a cetane number of fuel in use is lower than a predetermined cetane number; and
- a first catalyst reduction setting means for changing the engine rotation speed and the load for performing the rich combustion means to a high rotation speed side or a high load side when the high altitude determination means determines that the location point of the exhaust purification device is higher than the predetermined altitude or the low-cetane fuel determination means determines that the fuel in use is the low-cetane fuel.

5. The exhaust purification device as in claim 4, further comprising:
- an ignition measurement section for measuring timing of ignition; and
- an ignition time measurement means for measuring a time since the fuel is injected until the fuel is ignited, wherein
- the low-cetane fuel determination means determines whether the fuel in use is the low-cetane fuel based on a measurement value measured by the ignition time measurement means.

6. The exhaust purification device as in claim 4, further comprising:
- an intake pressure measurement section for measuring intake pressure of the engine, wherein
- the high altitude determination means determines whether the location point is higher than the predetermined altitude based on the intake pressure measured by the intake pressure measurement section.

* * * * *